United States Patent
Becker et al.

(12)

(10) Patent No.: US 6,479,002 B1
(45) Date of Patent: Nov. 12, 2002

(54) EXTRUSION OF PLANT MATERIALS ENCAPSULATED IN A THERMOPLASTIC

(75) Inventors: Silvan Becker, Satteldorf (DE); Heinz Traub, Blaufelden (DE)

(73) Assignee: Haller Formholz (DE)

(*) Notice: Subject to any disclaimer, the term of this patent is extended or adjusted under 35 U.S.C. 154(b) by 0 days.

(21) Appl. No.: 09/475,242

(22) Filed: Dec. 30, 1999

(30) Foreign Application Priority Data

Dec. 30, 1998 (DE) .......................................... 198 60 836

(51) Int. Cl.[7] .......................... B29C 47/76; B29C 47/10
(52) U.S. Cl. .................... 264/148; 264/102; 264/177.2; 264/211.23
(58) Field of Search ............... 264/102, 171.1, 264/177.11, 177.2, 211.21, 211.23, 211.11, 211, 210.2, 148, 51, 45.9

(56) References Cited

U.S. PATENT DOCUMENTS

| | | | | |
|---|---|---|---|---|
| 3,611,487 A | * | 10/1971 | Fairbanks | |
| 3,992,500 A | * | 11/1976 | Kruder et al. | |
| 4,107,787 A | * | 8/1978 | Ocker | |
| 4,798,473 A | * | 1/1989 | Rauwendaal | |
| 5,096,046 A | * | 3/1992 | Goforth et al. | |
| 5,096,638 A | * | 3/1992 | Meyke | |
| 5,518,677 A | * | 5/1996 | Deaner et al. | |
| 5,776,281 A | * | 7/1998 | Evans | |
| 5,811,038 A | * | 9/1998 | Mitchell | |
| 5,938,994 A | * | 8/1999 | English et al. | |
| 5,958,316 A | * | 9/1999 | Guntherberg et al. | |
| 6,011,092 A | * | 1/2000 | Seppala et al. | |
| 6,143,811 A | * | 11/2000 | Oda et al. | |
| 6,180,257 B1 | * | 1/2001 | Brandt et al. | |
| 6,210,792 B1 | * | 4/2001 | Seethamraju et al. | |
| 6,235,816 B1 | * | 5/2001 | Lorcks et al. | |
| 6,255,368 B1 | * | 7/2001 | English et al. | |
| 6,265,037 B1 | * | 7/2001 | Godavarti et al. | |
| 6,280,667 B1 | * | 8/2001 | Koenig et al. | |

FOREIGN PATENT DOCUMENTS

| | | | |
|---|---|---|---|
| DE | 2 245 871 | | 4/1974 |
| DE | 207432 A1 | | 9/1983 |
| EP | 0 165 093 | | 12/1985 |
| EP | 0 908 281 A1 | | 4/1999 |
| FR | 2 564 374 | | 11/1985 |
| FR | 2 609 927 | | 7/1988 |
| GB | 1443194 | * | 7/1996 |
| WO | WO 90/14935 | | 12/1990 |

\* cited by examiner

*Primary Examiner*—Mark Eashoo
(74) *Attorney, Agent, or Firm*—Nixon Peabody LLP; Donald R. Studebaker

(57) ABSTRACT

A method and an apparatus for producing a shaped article or molding, which preponderantly includes plant material and a thermoplastic material, which are both introduced into an extruder. The plant material is compacted under pressure in a first extruder section and together with the thermoplastic material heated to an intended temperature at which the thermoplastic material melts. The pressure is then reduced to a value at which residual moisture of the heated material is transformed into water vapor or steam, which is removed from the extruder. The heated, dehumidified material is then compacted and extruded to the desired molding.

17 Claims, 2 Drawing Sheets

EXTRUSION OF PLANT MATERIALS ENCAPSULATED IN A THERMOPLASTIC

BACKGROUND OF THE INVENTION

1. Field of the Invention

The invention relates to a method and an apparatus for the continuous production of shaped articles or mouldings, which preponderantly comprise small-sized plant material encapsulated in a thermoplastic material.

2. Description of the Related Art

Such shaped articles from wood shavings encapsulated in a thermoplastic material have long been used in the most varied fields, because they offer numerous advantages when compared with wood. More particularly, these relate to the dimensional stability and weather resistance, together with the insensitivity to fungal and insect attacks, while at the same time providing strength and processing characteristics comparable to those of wood. This also makes it possible to appropriately recycle plant waste materials such as wood shavings and flour.

It is known to produce in a discontinuous manner, shaped articles preponderantly, i.e., more than 50%, comprising small-sized plant material. The masses to be moulded are filled into dies or moulds, in which the-desired shape is produced under pressure and temperature.

German reference No. DE-OS 22 45 871, discloses the mixing of wood shavings and a plastics material, followed by the introduction of the mixture into an extruder. In the extruder the mixture is very rapidly heated-to an extrusion temperature and dehumidified by venting. In this method, undesired water vapour can still be present in the extruded product and must be removed from the latter by a special pressing device following the extruder.

SUMMARY OF THE INVENTION

The object of the invention is to provide a method and an apparatus for the production of shaped articles or mouldings, with which from moulding materials with a preponderant proportion of small-sized plant materials mouldings, can be continuously produced in a dimensionally accurate and very economic manner.

The invention provides a method for the continuous production of mouldings, which preponderantly comprise small-sized plant materials, which are encapsulated in a thermoplastic material, in which the small-sized plant material is introduced into an extruder, the plant material and the thermoplastic material are mixed and compacted under pressure, while setting a clearly defined temperature, which is above the melting point of the thermoplastic material, the pressure in at least one section of the same extruder is reduced to a value in which residual moisture of the plant material is transformed into water vapour, which is removed from the extruder and in a subsequent extruder section the heated, dehumidified material mixture of the plant material and the melted thermoplastic material is compacted and extruded to the desired moulding.

According to a fundamental concept of the invention, for a good extrudability of the material, a good bond between the thermoplastic material and the surface of the plant particles is essential. According to the invention, a bond is achieved in that through the process sequence a good heating of the plant material of up to 250° C. is obtained. A possible reason for the positive effect obtained is that the melted thermoplastic material can wet in an almost optimum manner the microscopically rough and fibrous surface of the process caused by, heated plant parts in conjunction with the intense mechanical working in the extruder. This leads to very high Van der waals bonding forces between the plant material and the thermoplastic material. This ensures the necessary cohesion when the moulding material passes out of the extruder and up to the time that the material has been completely solidified.

It is also necessary to remove to the greatest possible extent air inclusions and steam formed from residual moisture during processing in the extruder and this can be achieved by venting several times. It has proved advantageous in this connection to subject the small-sized plant material in the extruder to at least one processing cycle prior to the supply of the thermoplastic material and which covers the method steps compaction, as well as subsequent stress relief-and venting.

A particularly reliable removal of the residual moisture from the plant material is ensured if the small-sized plant material undergoes this processing cycle three times prior to the supply of the thermoplastic material.

As a result of the method according to the invention it is possible to produce mouldings with a proportion of above 50% small-sized plant material in a continuous, stable process. The plant material can be constituted by plant waste produced in large quantities such as wood flour, wood shavings, cereal chaff, straw bagasse (sugar cane straw), cellulose, cocoa, coconut or palm fibres, etc., which can be appropriately recycled.

The comminuted plant material usable for this method comprises particles in a size preferably between 0.5 and 10 mm, butt the use of smaller and larger particles is not excluded.

According to the invention, the plant material is introduced loose or as precompacted compacts and separately from the thermoplastic material into the extruder. The supply of these materials through separate supply or metering devices permits a high metering precision. When using a relatively moist plant material it is particularly important to extract moisture therefrom by compaction and heating, together with subsequent pressure reduction and without the thermoplastic material and only subsequently is the thermoplastic material supplied to the heated material. Good results can be obtained when using a plant material with a residual moisture content of less than 25% at normal or ambient temperature.

According to the invention, the plant material is used in the largely natural state in which it occurs. Such an untreated material or at the most precompacted by pressing or squeezing can have a relatively high moisture content between 10 and 20%. According to the invention, the moisture content of the plant material is reduced during preheating and/or in the extruder during compaction and stress relief.

The plant material temperature is below the carbonization temperature and above the melting point of the thermoplastic material, particularly between 120 and 200° C. For an adequate compaction of high-volume material, in the first extruder section through a corresponding construction of the extruder screw helixes, a pressure is set which is preferably between 5 and 50 bar. If the desired pressure is not obtained as a result of the strong compaction of the extrusion material, then on the extruder casing and in the extruder screw can additionally be provided heating elements for temperature control purposes. On reaching the desired temperature and pressure, values in a subsequent extruder section the pressure is suddenly dropped significantly, preferably to atmospheric pressure or even an underpressure. As a result of this brief, drastic pressure reduction suddenly can consequently without significant temperature losses the residual moisture in the plant material is transformed into steam, which is removed from the extruder at numerous points. The extrusion material is subsequently compacted and completely extruded to the desired shape.

Besides the improved strength of the mouldings produced according to the invention, the method of the invention is also particularly economically advantageous. Thus, the method can be carried out in only one extrusion machine. Moreover, the energy requirements are very low, because it is only necessary to melt the thermoplastic material once.

In order to produce particularly firm and strong mouldings, according to the invention the plant material in a proportion of 70 to 90% and the thermoplastic material in a proportion of 10 to 30% form the material supplied to the extruder. A relatively high proportion of plant material leads to an inexpensive end product, because for the inventive method it is possible to use conventional natural materials, which are, e.g., obtained as waste products in the wood-processing industry. The thermoplastic materials which can be used are in particular thermoplastic elastomers, e.g., polypropylene, polystyrene or comparable plastic materials.

According to the invention, a particularly useful product is obtained in that a biodegradable thermoplastic material is used. Such a material can, e.g., be constituted by natural rubbers or latexes. It is also possible to use starch-containing starting materials, as well as other natural products, which have a suitable thermoplastic behaviour. The prerequisite is that these materials melt in a temperature range below the carbonization temperature of the plant material, particularly at a temperature between 100 and 200° C. and after solidification form a firm bond with the plant material.

Preference can also be given to a method variant in which the thermoplastic material is introduced in the melted state into the extruder. This can in particular be advantageous if the thorough mixing of the small-sized plant material with the thermoplastic material takes place over a comparatively short extruder section. If the thermoplastic material is supplied in an already melted form, there is no time loss through the melting of pellets or a granulate end instead the thermoplastic material immediately starts to wet the small-sized plant material on contacting the same.

To further increase the strength of the end product, it is advantageous according to the invention that additionally a fibrous material is introduced into the extruder and incorporated into the extrusion material. This can in particular be constituted by organic materials from plant and/or animal fibres and hair, as well as synthetic textiles and industrial fibres, such as glass, mineral or metal fibres. This fibrous material supply can take place at a random point on the extruder. In this way products with an increased breaking strength can be obtained.

An aesthetically pleasing end product is obtained if additionally at least one dye is used. The plant material can be dyed beforehand and/or dye can be introduced into the extruder. Apart from the synthetic colouring agents and varnishes, it is also possible to use a plant or mineral-based pigment, which ensures a good environmental compatibility. With the admixing of colouring substances it is possible to produce mouldings in any random colour, which following onto the shaping operation requires no further surface treatment. Compared with conventional, painted products the advantage is that even when undesired scratches occur or following a material-removing machining of the product, there is no deterioration of the colouring.

Advantageously the present invention is further developed in that additionally a starch-containing material is introduced into the extruder. Such materials can be physically or chemically obtained starches, together with starch-containing flours or finely divided, starch-containing plant parts. Such material, e.g., from corn or rice, constitute an inexpensive filler and binder, which also improves the rottability for a particularly environmentally compatible, recyclable or compostable shaped article. It is also possible to supply a lubricant such as a natural oil or a resin, so that a particularly mixing and compaction, together with a smooth surface of the end product are obtained.

According to another aspect of the invention, it is advantageous if prior to the complete extrusion of the homogenized extrusion material, gas in a clearly defined quantity is supplied thereto. As a result of the uniform incorporation of the clearly defined gas quantity following the final venting, during the subsequent mixing a desired porosity can be set in the end product. As a result of planned gassing or expansion of the extrusion material it is, e.g., possible to set an increased insultating characteristic or lower density.

By way of the method according to the invention, the extrusion material can be extruded to a rod material by a mould at the exit from the extrusion press. As a result of the good bond obtained between the plant material and the thermoplastic material, it is possible for the extrusion material to be extruded by a mould at the exit from the extruder to a solid or hollow rod material, which even after passing out of the mould can be bent to a desired shape. This makes it possible to produce winding or other arcuate contours on a rod material. For a continuous extruder operation it is possible to provide suitable cutting or sawing devices through which the rod material can be cut to the desired size. It is also possible to produce a granulate, which is subsequently processed in a conventional extruder, so that the problem of a high residual moisture content in the material mixture no longer exists.

A preferred embodiment of the inventive method comprises that the plant material is heated in the extruder and additionally on conveying to the extruder and that a clearly defined, uniform state of the plant material particles is produced. The plant material particle state can preferably be monitored by means of a sensor. As a result of a very uniform state of the individual plant parts at the start of compaction with the melted on thermoplastic material in the extruder, a reliable material bond and a stable performance of the method are ensured. Apart from standardizing the temperature state, it is also appropriate to standardize and set to a clearly defined value the moisture level and optionally further physical state conditions of the individual particles.

According to the invention, it is appropriate to heat by means of a heater, which is controlled by means of a control device, so that the desired, clearly defined plant material state occurs at a predeterminable plant material conveying rate. The heater can be located in or upstream of the first extruder section.

In order to avoid undesired water vapour and air inclusions in the mouldings to be formed, according to the invention, in the extruder the materials pass through a processing cycle covering mixing, compaction, as well as subsequent stress relief and venting and the processing cycle is performed at least twice, particularly three times within the extruder. With a multistage method performance, particularly with venting two, three or more times, a particularly high material consistency is obtained.

The method according to the invention more particularly makes it possible to produce sections, planks, panels, posts and tubes with a virtually random cross-sectional contour and having a particularly high strength in a simple and particularly efficient manner.

For the performance of the above-described method it is possible to use conventional extrusion apparatus, which normally have one, two or more synchronous extruder shafts. Such an apparatus comprises an extruder having at least two extruder shafts mounted in a casing, a supply opening and a discharge opening, while the extruder shafts are in each case provided at least one delivery zone, a kneading zone and a compaction zone.

A particularly suitable apparatus for performing the method comprises the extruder being constructed as a contrarotating extruder, in which the extruder shafts are driven in opposite directions, that at least two compaction zones are provided, to which is connected in the extrusion direction a stress relief zone, in which there is a reduced pressure, and that in the vicinity of the at least two stress relief case a casing opening with a gas vent.

In order to produce mouldings from a thermoplastic material with a high proportion of small-sized plant material, a very intense mixing of the two materials is necessary. This is in particular ensured by the use of a contrarotating extruder. As a result of the at least double venting of the extrusion material in the extruder, it is also possible to adequately remove undesired residual moisture and gas inclusions, which are prejudicial to a firm bond within the extrusion material. In the vicinity of the stress relief zones, which are obtained by a corresponding construction of the screw helixes, there is a rapid, short-duration gas venting, preferably by means of a fan or a vacuum pump.

An almost optimum wetting of the surface of the plant material particles is aided by a planned, substantially uniform heating of the particles. According to the invention this is achieved in that a heater is provided, which heats to a clearly predetermined temperature the small-sized plant material. The heater can be constituted by known, electric heating coils or heating water lines. Upstream of the extruder it is also possible to have a continuous heating or rotary furnace.

For a uniform production result it is advantageous to provide, at least at the heater outlet, a sensor making it possible to determine the temperature and optionally further state values of the heated plant material. A sensor suitable for temperature and/or moisture measurement can in known manner be based on an inductive or capacitive operating principle or can perform a contactless measurement by infrared, micro or ultra-high frequency waves.

For a uniform operation of the apparatus, according to the invention a control is provided through which it is possible to control the extruder drive and the heating capacity of the heater in accordance with a predeterminable discharge capacity of the extruder. The control is also linked with the sensor.

To bring about an exact supply of the extrusion material or additives, such as dyes or lubricants, according to a further development of the invention, spaced from the supply opening, at the extruder is provided at least one metering device for the supplementary, clearly defined material supply. The metering device can be a single or twin-shaft extruder.

In order to be able to largely dehumidify and vent the small-sized plant material prior to the supply of the thermoplastic material, according to a development of the inventive apparatus, it is preferable, considered in a conveying direction of the extruder, to have upstream of at least one metering device at least one, but in particular three stress relief zones and in the vicinity of the latter to have in each case one casing opening with a single gas vent direction.

BRIEF DESCRIPTION OF THE DRAWINGS

The invention is described in greater detail hereinafter relative to preferred embodiments and the attached drawings, which show.

DETAILED DESCRIPTION OF THE DRAWINGS

Figure 1:
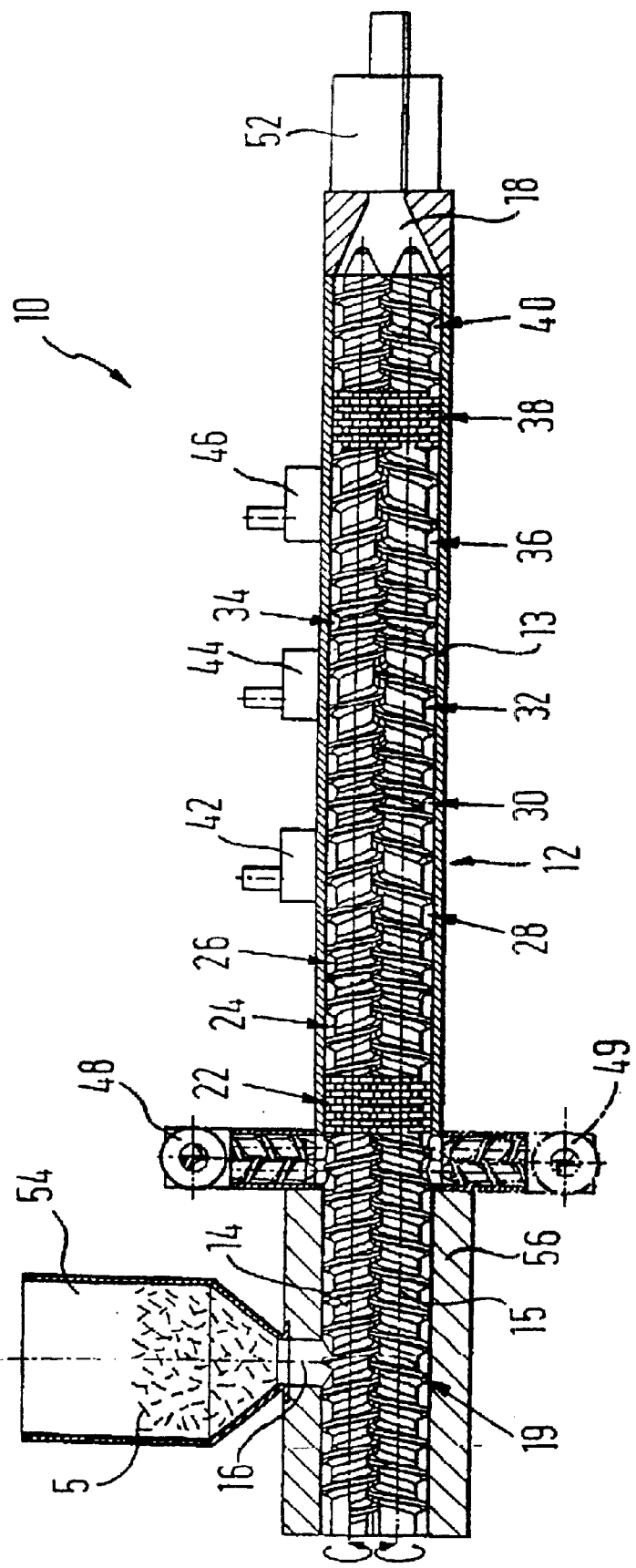
FIG. 1 A diagrammatic cross-sectional view through an extruder for illustrating the invention.

A fundamentally known apparatus with a contrarotating extruder 12 is shown in FIG. 1. In a casing 13 are mounted two extruder shafts 14, 15, which are driven in opposite rotation directions in accordance with the arrows by a drive not shown. A small-sized plant material 5 is passed by means of a supply opening 16 and a tamping or packing hopper 54 into an introductory delivery zone 19 at extruder shafts 14 and 15. In this area a cylindrical heating element 56 is placed around the casing 13 and permits the optional heating of the plant material 5, in addition to the compaction heating through the extruder 12. In the introductory delivery zone 19 are also located the gas vents according to the invention, which are not shown for reasons of clarity in FIG. 1 and will be explained subsequently. In the vicinity of the introductory delivery zone 19 the thermoplastic material can be. supplied in a solid or already melted state by the metering devices 48, 49, which are fitted in mutually 180° offset manner to the casing 13. In the case of a common supply of the plant material and the thermoplastic material, the metering devices 48, 49 can also introduce via the supply opening 16 in metered manner additives, e.g., dyes or a lubricant.

In the conveying direction of the material to be extruded from the supply opening 16 to a discharge opening 18 of the extruder, a first kneading zone 22 is connected to the introductory delivery zone 19. The first kneading zone 22 comprises kneading fingers fitted to the extruder shafts 14, 15, which ensure an intense and thorough mixing and substantial homogenization of the extrusion material. In the further course of the extruder is then connected a first extruder section, which comprises a first delivery zone 24 for further, intense, thorough mixing and homogenization, a first compaction zone 26 for building up a pressure of 5 to 50 bar or higher, as well as a first stress relief zone 28 with an extrusion pressure reduction. In the vicinity of the first stress relief zone 28 is provided a first gas vent 42, through which a vacuum can be set in the first stress relief zone 28, in order to remove from the extrusion material evaporated residual moisture or undesired gas inclusions.

Following on in the extrusion direction are provided a second and a third extrusion section constructed in essentially the same way as the first extrusion section. Thus, the second extrusion section has a second compaction zone 50, as well as a second stress relief zone 32 with a second gas vent 44, the third extrusion section also having a third compaction zone 34 and a third stress relief zone 36 with a third gas vent 46. This leads to a triple repeat of the processing cycle comprising compaction, mixing, stress relief and venting. As a result of this multistage working of the extrusion material a very good homogenization and almost complete venting are ensured.

Prior to the extrusion of the mixture at the discharge opening 18 of the extruder 12 by a mould 52, there is a final kneading zone 38 and a final delivery zone 40, so that there is a final homogenization or a building up of a final extrusion pressure of up to 200 bar and higher.

Figure 2:
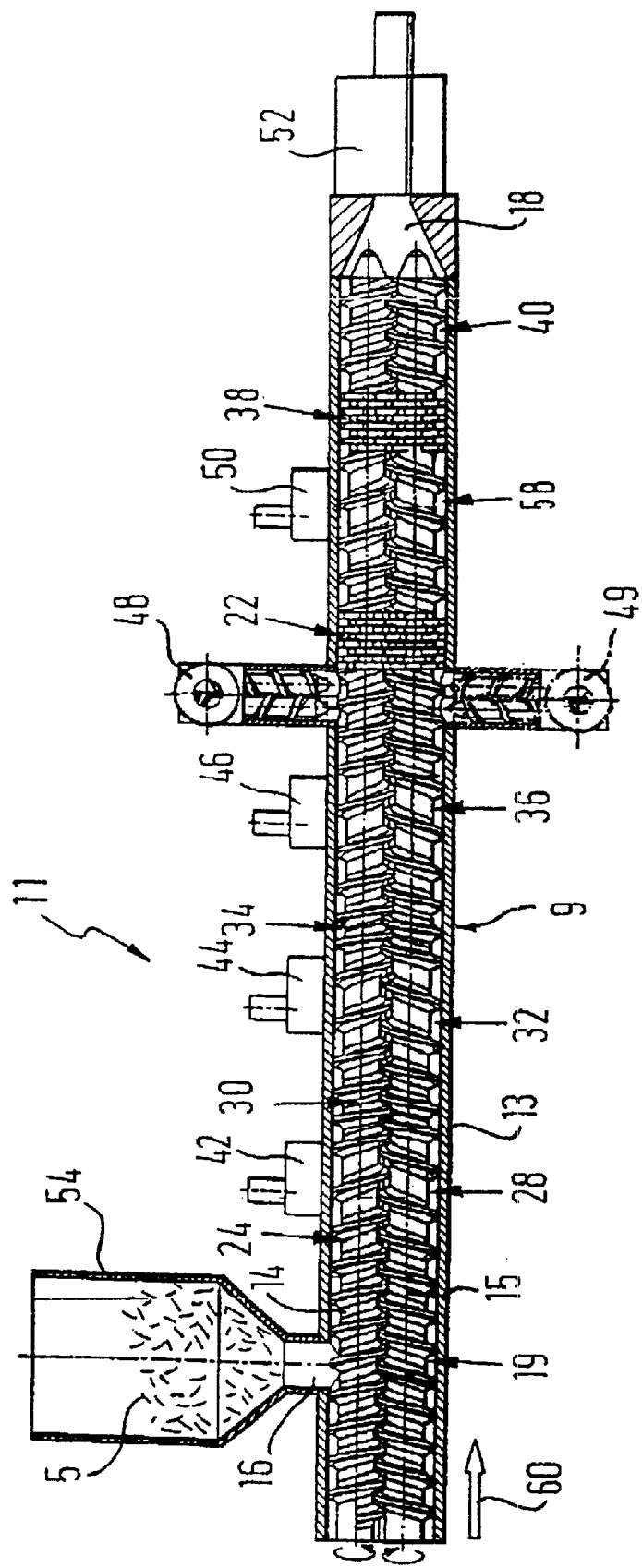
FIG. 2 A diagrammatic cross-sectional view through a preferred embodiment of the invention.

An apparatus 11 according to the. invention with a contrarotating extruder 9 is shown in FIG. 2. In FIG. 2 components and parts corresponding to those in the apparatus 10 of FIG. 1 are given the same reference numerals as in the latter.

Unlike in FIG. 1, in the case of the apparatus 11 at in all three points of the extruder 9 (in a conveying direction 60 of said extruder 9), prior to the supply of the thermoplastic material by means of the metering devices 48, 49 there are gas vents 42, 44, 46, as well as the associated compaction zones 30, 34 and stress relief zones 28, 32, 36.

In the apparatus 11 of FIG. 2, following the metering devices 48, 49, there is a fourth gas vent 50 with an associated stress relief zone 58.

It has been shown in practice that by means of the apparatus 11, i.e., by means of a triple venting of the small-sized plant material 5 prior to the supply of the thermoplastic material, a particularly good dehumidifying and venting of the material can be achieved.

While the present invention has been described hereinabove with reference to preferred embodiments, it should be understood that modification of such embodiments may be made without departing from the spirit and scope of the present invention. Consequently, the spirit and scope of the present invention are to be limited only by the appended claims.

What is claimed is:

1. A method for the continuous production of mouldings including a plant material encapsulated in a thermoplastic material comprising the steps of:

initially introducing the plant material into an extruder;

delivering the plant material in an extrusion direction in an introductory extruder section of the extruder such that a defined uniform state of particles of the plant material is set;

compacting, heating and dehumidifying the plant material in the introductory extruder section without the thermoplastic material;

subsequently introducing the thermoplastic material to the extruder in one of a solid and a liquid state;

mixing the heated and dehumidified plant material with the thermoplastic material at a defined extrusion temperature; and extruding the moulding from an outlet of the extruder.

2. Method according to claim 1, wherein the plant material undergoes three times a processing cycle in the extruder prior to the supply of the thermoplastic material and said cycle covers the method stages of compaction and subsequent stress relief and venting.

3. Method according to claim 1, wherein the plant material is introduced loose or as precompacted compacts to the extruder, separately from the thermoplastic material.

4. Method according to claim 1, wherein the plant material forms a proportion of 70 to 90% and the thermoplastic material a proportion of 10 to 30% of the material supplied to the extruder.

5. Method according to claim 1, wherein the thermoplastic material includes a biodegradable thermoplastic material.

6. Method according to claim 1, wherein the thermoplastic material is introduced into the extruder in the melted state.

7. Method according to claim 1, wherein additionally a fibrous material, dye or starch-containing material is introduced into the extruder and incorporated into the material mixture.

8. Method according to claim 1, wherein the plant material is heated to a temperature of up to 250° C.

9. Method according to claim 8, wherein the heating takes place by means. of a heater, whose heating capacity is controlled by means of a control device, so that for a predeterminable plant material conveying rate the desired, clearly defined plant material state occurs.

10. Method according to claim 1, wherein the plant material is additionally heated on conveying to the extruder.

11. Method according to claim 1, wherein in the extruder the materials undergo a processing cycle comprising mixing, compaction, as well as subsequent stress relief and venting and that said processing cycle is performed at least twice within the extruder.

12. Method according to claim 11, wherein said processing cycle is performed three times within the extruder.

13. Method according to claim 1, wherein prior to complete extrusion of the homogenized material mixture, a defined gas quantity is supplied thereto.

14. Method according to claim 1, wherein the material mixture is extruded through a mould at the extruder outlet to a rod material which, after passing through the mould, is bent to a desired shape and/or cut to length.

15. Method according to claim 1, wherein the plant material and thermoplastic material are compacted under pressure in the extruder at said defined extrusion temperature.

16. Method as defined in claim 1, where said defined extrusion temperature is greater than a melting point of the thermoplastic material.

17. Method as defined in claim 16, wherein a pressure in at least one section of the extruder is reduced to a value at which residual moisture of the plant material is transformed into water vapor and removed from the extruder.

\* \* \* \* \*